(12) United States Patent
Huang

(10) Patent No.: US 8,241,028 B2
(45) Date of Patent: Aug. 14, 2012

(54) MOLD WITH EJECTION MECHANISM

(75) Inventor: Chien-Feng Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 59 days.

(21) Appl. No.: 12/843,064

(22) Filed: Jul. 26, 2010

(65) Prior Publication Data

US 2011/0045119 A1   Feb. 24, 2011

(30) Foreign Application Priority Data

Aug. 19, 2009   (CN) .......................... 2009 1 0305802

(51) Int. Cl.
*B29C 45/40* (2006.01)
(52) U.S. Cl. ...................... 425/192 R; 425/444; 425/556
(58) Field of Classification Search .................. 425/190, 425/444, 468, 556, DIG. 58, 192 R
See application file for complete search history.

(56) References Cited

U.S. PATENT DOCUMENTS

| | | | | | |
|---|---|---|---|---|---|
| 3,844,703 | A | * | 10/1974 | Hutter | 425/556 |
| 3,871,611 | A | * | 3/1975 | Taketa | 249/102 |
| 3,900,183 | A | * | 8/1975 | Wallace | 249/68 |
| 3,963,209 | A | * | 6/1976 | Muller | 249/67 |
| 4,280,549 | A | * | 7/1981 | Gibbs | 164/113 |
| 4,379,684 | A | * | 4/1983 | Katagiri et al. | 425/78 |
| 4,545,753 | A | * | 10/1985 | Hehl | 425/350 |
| 4,645,446 | A | * | 2/1987 | Hehl | 425/350 |
| 4,793,785 | A | * | 12/1988 | Osada | 425/116 |
| 4,929,170 | A | * | 5/1990 | Boskovic | 425/556 |
| 5,059,105 | A | * | 10/1991 | Baird | 425/116 |
| 5,316,467 | A | * | 5/1994 | Starkey | 425/438 |
| 5,511,967 | A | * | 4/1996 | Berdan | 425/533 |
| 5,718,930 | A | * | 2/1998 | Stengel | 425/556 |
| 6,872,069 | B2 | * | 3/2005 | Starkey | 425/556 |
| 7,140,868 | B1 | * | 11/2006 | Steele et al. | 425/438 |
| 7,214,046 | B2 | * | 5/2007 | Gakovic | 425/78 |
| 7,267,538 | B2 | * | 9/2007 | Morales-Centeno | 425/190 |
| 2004/0182806 | A1 | * | 9/2004 | Figueroa | 211/105.4 |
| 2004/0241278 | A1 | * | 12/2004 | Morales-Centeno | 425/556 |

* cited by examiner

*Primary Examiner* — Yogendra Gupta
*Assistant Examiner* — Emmanuel S Luk
(74) *Attorney, Agent, or Firm* — Altis Law Group, Inc.

(57) ABSTRACT

An exemplary mold includes a core plate receiving a core insert, a cavity plate receiving a cavity insert, and an ejection mechanism for ejecting the core insert. The core insert defines a first molding surface, and the cavity insert defines a second molding surface cooperating with the first molding surface. The ejection mechanism includes a top plate, a bottom plate, and an ejection member fixed to the top plate. The ejection member includes an ejection rod and an ejection head. The ejection rod includes a first rod, and a first engaging body forming a protrusion facing toward the first rod. The ejection head includes a second rod, a second engaging body defining a recess facing toward the second rod, and an ejection portion engaged with the core insert. The protrusion is movably engaged in the recess, so that if the ejection rod goes off-axis, the core insert can stay on-axis.

10 Claims, 6 Drawing Sheets

MOLD WITH EJECTION MECHANISM

BACKGROUND

1. Technical Field

The present disclosure relates to a mold that can prevent a core insert from deviating from a correct path of travel when driven by an ejection mechanism.

2. Description of Related Art

Referring to FIG. 1, a conventional mold 40 includes a core insert 41, a cavity plate 42, a support plate 43, a core plate 44, a cavity plate 45, and an ejection mechanism 30 to eject the core insert 41. The support plate 43 is attached to the core plate 44, and the core insert 41 is movably received in the core plate 44. The core insert 41 defines a first molding surface 410. The cavity insert 45 is received in the cavity plate 42, and defines a second molding surface 450. When the first molding surface 410 and the second molding surface 450 are brought into contact with each other, they cooperatively define a molding cavity therebetween for molding one or more products or items.

The ejection mechanism 30 includes a top plate 31, a bottom plate 32, an ejection member 33, a washer 34, and a fastener 35. The top plate 31 defines a first fastening hole 310 facing toward the bottom plate 32. The bottom plate 32 defines a first through hole 320. One (top) end of the ejection member 33 is received in the first through hole 320. An opposite (bottom) end of the ejection member 33 is movably received in the support plate 43, and always stays in contact with the core insert 41. The top end of the ejection member 33 defines a second fastening hole 330 aligning with the first fastening hole 310. The washer 34 is disposed between the top plate 31 and the bottom plate 32, and defines a second through hole 340 communicating with the first fastening hole 310 and the first through hole 320. The fastener 35 is screwed into the first fastening hole 310, and into the second fastening hole 330 through the second through hole 340, to fasten the top plate 31 and the ejection member 33 together.

When the mold 40 is in use, in an exemplary first stage of operation, the core plate 44 and the cavity plate 42 are separate from each other, with the core insert 41 in the core plate 44 in a retracted position. This initial state is illustrated in FIG. 1.

In a second stage of operation, the core plate 44 and the cavity plate 42 are moved into contact with each other, such that the first molding surface 410 is brought into contact with the second molding surface 450. In this position, molten material between the first and second molding surfaces 410, 450 is used to make the molded products. It is important for the first and second molding surfaces 410, 450 to be in precise contact with each other to ensure accurate molding.

In a third stage of operation, the core plate 44 and the cavity plate 42 are moved to separate from each other, and simultaneously the top plate 31 drives the ejection member 33 down to push the core insert 41 down from the retracted position to an extended position in which the core insert 41 projects from the core plate 44 to a maximum extent. (This is known in the art as "ejecting" the core insert 41.) Throughout this time, the first and second molding surfaces 410, 450 remain in contact with each other.

After that, the core plate 44 and the cavity plate 42 are moved to separate from each other, and simultaneously the top plate 31 drives the ejection member 33 up such that the core insert 41 moves back up to the retracted position in the core plate 44 (as illustrated in FIG. 1). The first and second molding surfaces 410, 450 are thus detached from each other, so that the molded products can be obtained.

For each molding cycle as described above, the top plate 31 drives the ejection member 33 down and then up. After the mold 40 has been used repeatedly over a long time, the ejection mechanism 30 is liable to become worn. In particular, the ejection member 33 is liable to deviate (deflect) from travel along an exact vertical path, and is liable to cause the core insert 41 to be incorrectly oriented off-axis (i.e., deviating from the vertical). This means that when the first molding surface 410 is brought into contact with the second molding surface 450, the first molding surface 410 is liable to deviate (deflect) relative to the second molding surface 450. An unwanted gap is thus created between the first molding surface 410 and the second molding surface 450. Molten plastic can flow into the gap, thereby adversely affecting the quality of the molded products Therefore, what is needed is a mold to overcome the shortcomings described above.

BRIEF DESCRIPTION OF THE DRAWINGS

All the views are schematic.

FIG. 5 is an exploded, isometric view of other parts of the mold of

FIG. 1 besides the ejection mechanism.

DETAILED DESCRIPTION

Figure 1:
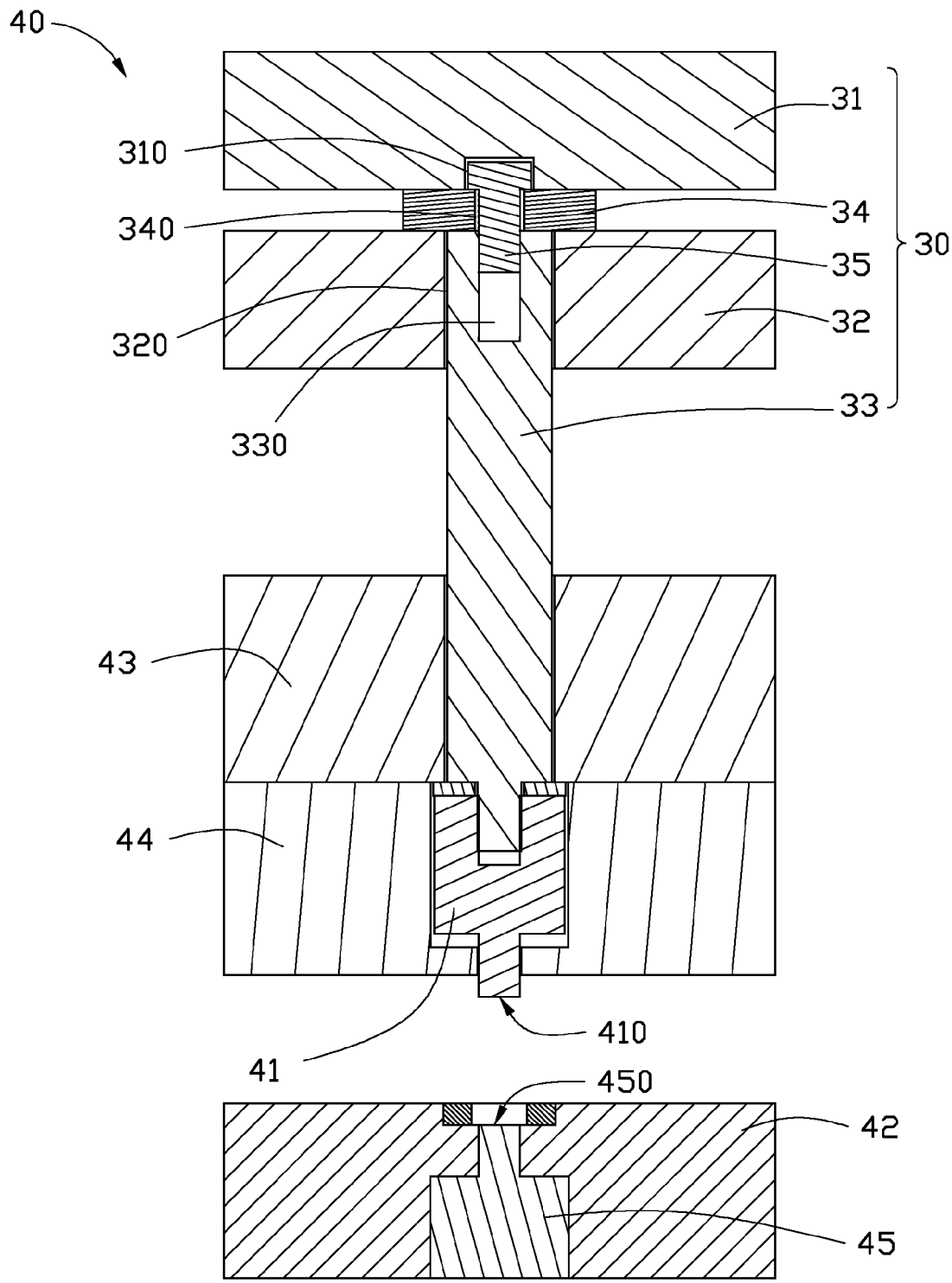
FIG. 1 is cross-sectional view of a conventional mold.
Figure 2:
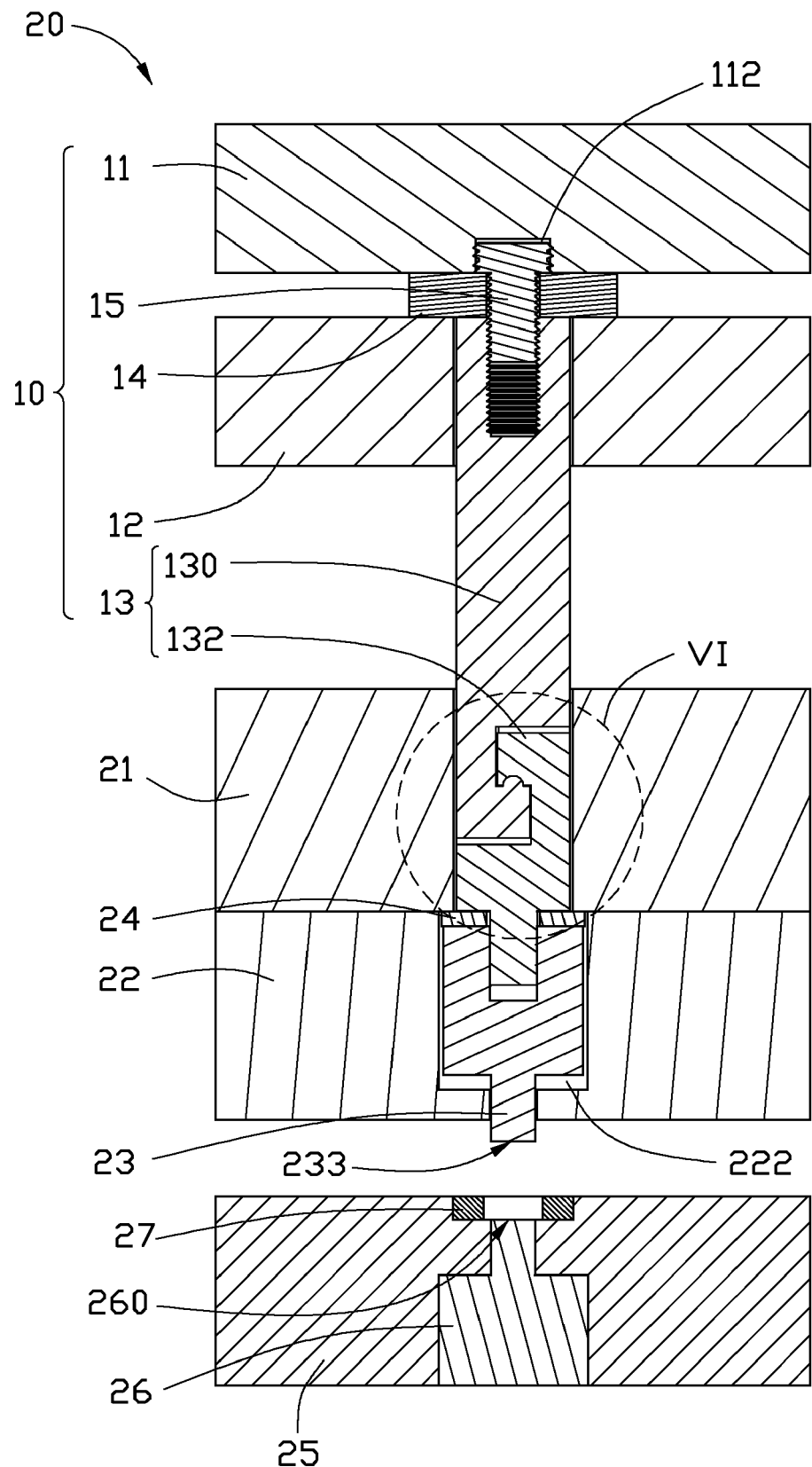
FIG. 2 is a cross-sectional view of a mold in accordance with an exemplary embodiment.

Referring to FIG. 2, a mold 20 according to an exemplary embodiment is disclosed. The mold 20 includes an ejection mechanism 10, a support plate 21, a core plate 22 receiving a core insert 23 and a core washer 24, and a cavity plate 25 receiving a cavity insert 26 and a cavity washer 27. The core insert 23 defines a first molding surface 233, and the cavity insert 26 defines a second molding surface 260 opposite to the first molding surface 233. The first molding surface 233 and the second molding surface 260 can cooperatively define a molding cavity therebetween for molding one or more products or items (moldings). The ejection mechanism 10 is configured to eject the core insert 23. Thereby, solidified products between the first molding surface 233 and the second molding surface 260 can be obtained after a molding process is completed.

The ejection mechanism 10 includes a top plate 11, a bottom plate 12, an ejection member 13, a washer 14, and a fastener 15. The ejection member 13 includes an ejection rod 130 and an ejection head 132. In one stage of the molding process, the top plate 11 drives the ejection rod 130 to move toward the cavity plate 25, causing the ejection head 132 to eject the core insert 23.

Figure 3:
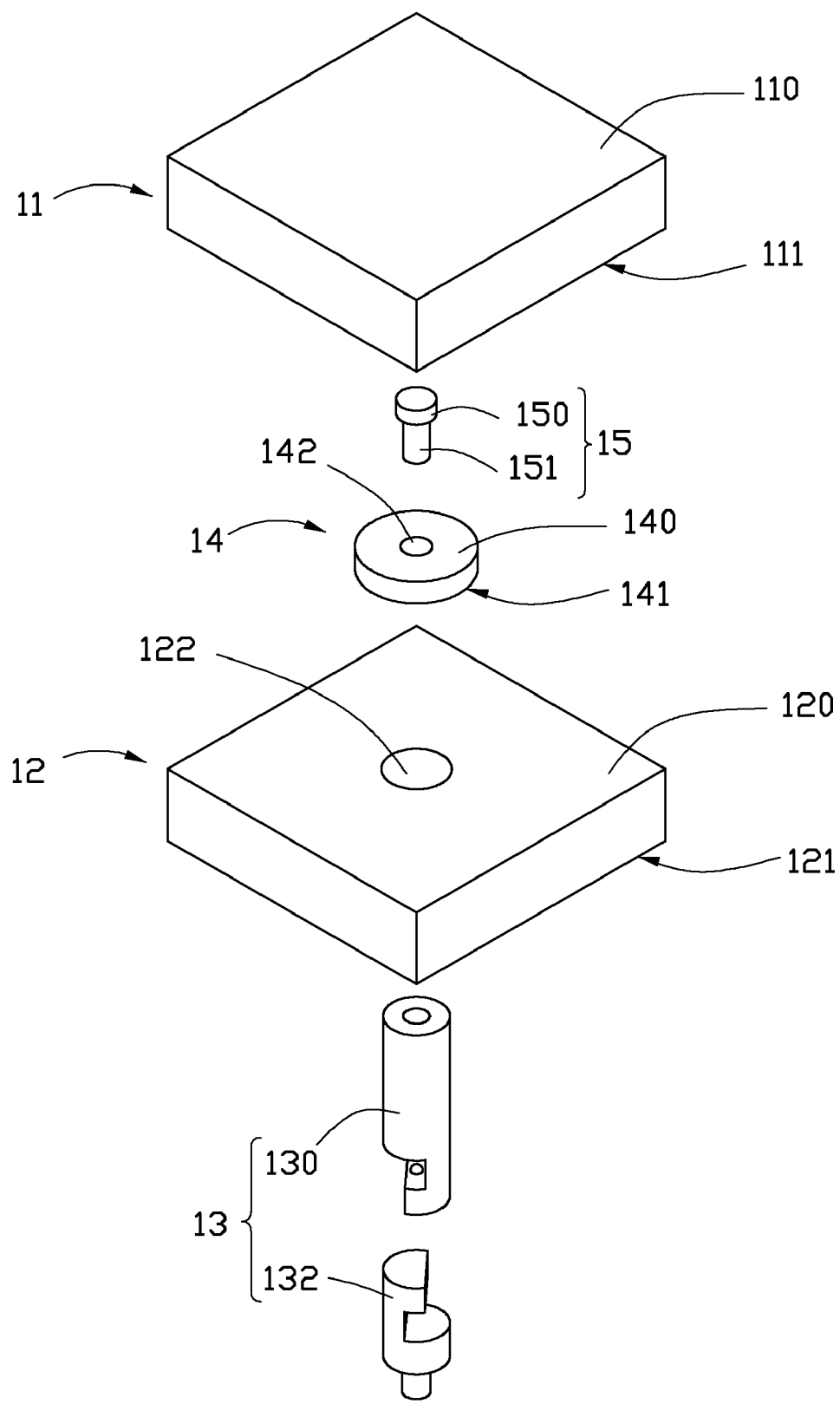
FIG. 3 is an exploded, isometric view of an ejection mechanism of the mold of FIG. 1.

Referring also to FIG. 3, the top plate 11 is a rectangular board defining a first surface 110 and a second surface 111 at opposite sides thereof. The first surface 110 is farthest away from the bottom plate 12, and the second surface 111 faces toward the bottom plate 12. The second surface 111 defines a first fastening hole 112 therein. In the exemplary embodiment, the first fastening hole 112 is a threaded blind hole.

The bottom plate 12 is shaped like the top plate 11, and includes a third surface 120 and a fourth surface 121 at opposite sides thereof. The third surface 120 faces toward the top plate 11, and the fourth surface 121 is farthest away from the top plate 11. The bottom plate 12 defines a first through hole 122, which spans between the third surface 120 and the fourth surface 121.

The ejection member 13 is cylinder-shaped, and includes an ejection rod 130 and an ejection head 132. The ejection rod 130 extends through the first through hole 122 of the bottom plate 12 and is fixed to the top plate 11 by the fastener 15. The ejection head 132 always stays in contact with the core insert 23.

Figure 4:
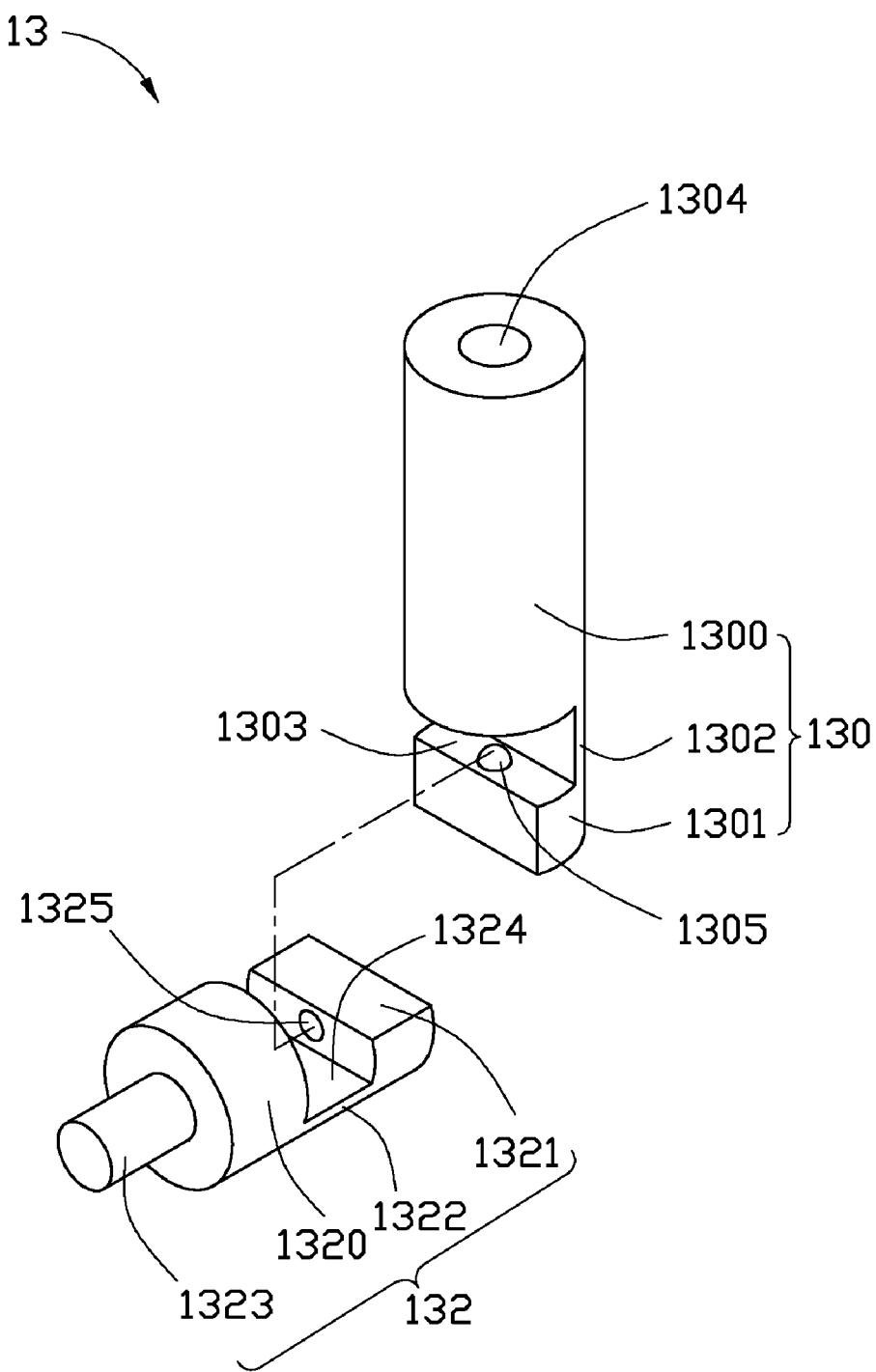
FIG. 4 is an enlarged, isometric view of an ejection member of the ejection mechanism of FIG. 3.

Referring also to FIG. 4, the ejection rod 130 includes a first rod 1300, a first engaging body 1301, and a first connecting body 1302 between the first rod 1300 and the first engaging body 1301. The first rod 1300, the first engaging body 1301, and the first connecting body 1302 cooperatively define a first receiving space 1303 therebetween. The ejection rod 130 defines a second fastening hole 1304 in one end surface of the first rod 1300 farthest away from the first engaging body 1301, and forms a protrusion 1305 on one end surface of the first engaging body 1301 facing toward the first rod 1300.

The ejection head 132 includes a second rod 1320, a second engaging body 1321, a second connecting body 1322 between the second rod 1320 and the second engaging body 1321, and a first ejection portion 1323. The second rod 1320, the second engaging body 1321, and the second connecting body 1322 cooperatively define a second receiving space 1324 therebetween. The ejection head 132 defines a recess 1325 in one end surface of the second engaging body 1321 facing toward the second rod 1320. The protrusion 1305 and the recess 1325 are both hemisphere-shaped so that the protrusion 1305 can fit in the recess 1325 well.

In assembly of the ejection rod 130, the first engaging body 1301 is pushed into the second receiving space 1324, and the second engaging body 1321 is simultaneously pushed into the first receiving space 1304, causing the protrusion 1305 to be movably retained within the recess 1325.

The washer 14 is disposed between the top plate 11 and the bottom plate 12. The washer 14 includes a fifth surface 140 abutting the top plate 11, and a sixth surface 141 abutting the bottom plate 12. The washer 14 defines a third fastening hole 142, which is a through hole spanning between the fifth surface 140 and the sixth surface 141. The diameter of the third fastening hole 142 is slightly greater than that of the ejection member 13.

The fastener 15 is a bolt that includes a threaded head 150 and a threaded shaft 151 integrally connecting with each other. The threaded head 150 is screwed into the first fastening hole 112, and the threaded shaft 151 is extended through the third fastening hole 142 and screwed into the second fastening hole 1304. Hence, the top plate 11, the washer 14, and the ejection member 13 are fixed together by the fastener 15.

Figure 5:
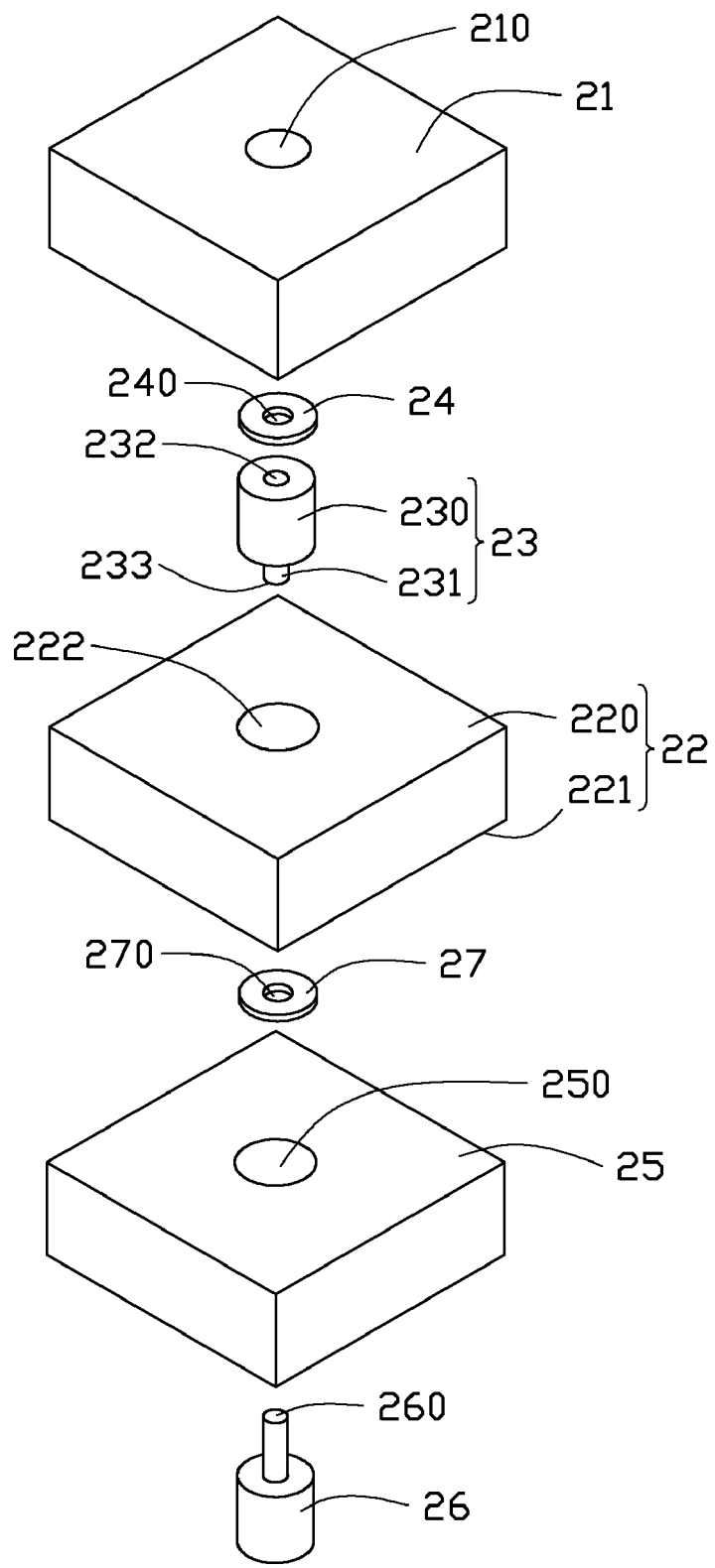

Referring to FIGS. 3 and 5, the support plate 21 is disposed on the core plate 22 and always remains in contact therewith. The support plate 21 defines a second through hole 210. The diameter of the second through hole 210 is slightly greater than that of the ejection member 13.

The core plate 22 includes a seventh surface 220 and an eighth surface 221 at opposite sides thereof. The core plate 22 defines a first cavity 222, which spans between the seventh surface 220 and the eighth surface 221. In the exemplary embodiment, the first cavity 222 is a stepped through hole having a single circumferential (e.g. annular) step.

The core insert 23 is shaped corresponding to the first cavity 222, and includes a second ejection portion 230 and a molding portion 231 integrally connecting with each other. The second ejection portion 230 defines an ejection hole 232 therein, and the molding portion 231 defines the first molding surface 233. The core insert 23 is retained within the first cavity 222, and the support plate 21 is disposed on the core plate 22 to prevent the core insert 23 from disengaging from the core plate 22.

The core washer 24 defines a third through hole 240. The diameter of the third through hole 240 is slightly greater than that of the first ejection portion 1323 of the ejection member 13. The core washer 24 is retained within a top portion of the first cavity 222. The ejection member 13 extends through the second through hole 210 and the third through hole 240, with the first ejection portion 1323 retained within the ejection hole 232.

The cavity insert 26 is shaped like the core insert 23, and defines the second molding surface 260, which faces toward the first molding surface 233. The cavity washer 27 is shaped like the core washer 240, and defines a fourth through hole 270. The cavity plate 25 is shaped somewhat like the core plate 22, and defines a second cavity 250 therein. The second cavity 250 is a stepped through hole, with two annular steps. Detailedly, the second cavity 250 includes a wide upper portion, a narrow middle portion, and a wide lower portion. The second cavity 250 receives the cavity insert 26 in the middle and lower portions, and the cavity washer 27 in the upper portion.

When the mold 20 is in use, in an exemplary first stage of operation, the core plate 22 and the cavity plate 25 are separate from each other, with the core insert 23 in the core plate 22 in a retracted position. This initial state is illustrated in FIG. 2.

In a second stage of operation, the core plate 22 and the cavity plate 25 are moved into contact with each other, such that the first molding surface 233 is brought into contact with the second molding surface 260. In this position, molten material between the first and second molding surfaces 233, 260 is used to make the molded products.

Figure 6:
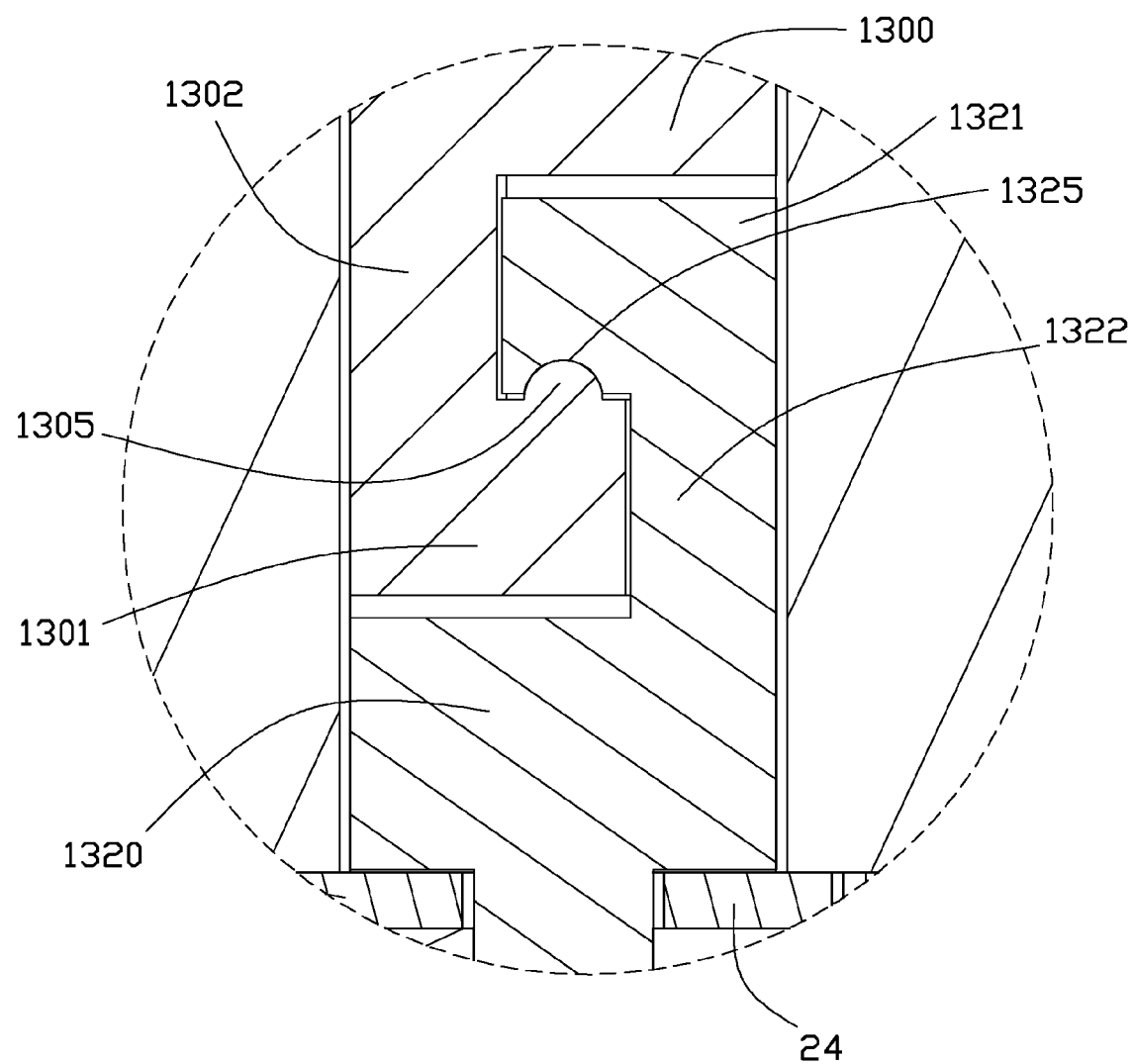
FIG. 6 is an enlarged view of a circled portion VI of FIG. 2.

In a third stage of operation, the core plate 22 and the cavity plate 25 are moved to separate from each other, and simultaneously the top plate 11 drives the ejection rod 130 of the ejection member 13 to move down. Referring also to FIG. 6, the first rod 1300 moves to contact the second engaging body 1321, and the first engaging body 1301 moves to contact the second rod 1320, such that the ejection head 1302 pushes the core insert 22 down from the retracted position to an extended position. Throughout this time, the first and second molding surfaces 233, 260 remain in contact with each other.

After that, the core plate 22 and the cavity plate 25 are moved to separate from each other, and simultaneously the top plate 11 drives the ejection rod 130 to move up. Referring also to FIG. 6, the protrusion 1305 remains movably engaged in the recess 1325, and the ejection rod 130 drives the ejection head 132 to move up. Thereby, the core insert 22 is moved from the extended position back up to the retracted position (as illustrated in FIG. 2). Thus, the first molding surface 233 and the second molding surface 260 detach from each other, the molded products can be obtained, and the mold 20 is returned to the initial state (as illustrated in FIG. 2). In addition, even if the ejection rod 130 deviates (deflects) from a precise vertical path (i.e., goes off axis) in the first through hole 122 during such movement, the ejection head 132 does not necessarily deflect from a precise vertical path (i.e. go off axis) in the second through hole 210, due to the movable engagement of the protrusion 1305 in the recess 1325. As a result, the core insert 23 does not necessarily deflect relative to the cavity insert 26 during such movement, so that the core insert 23 is properly position for the next molding cycle.

Although the present disclosure has been specifically described on the basis of certain embodiments thereof, the disclosure is not to be construed as being limited to the described embodiments. Various changes or modifications may be made to the embodiments without departing from the scope and spirit of the disclosure.

What is claimed is:

1. A mold comprising:
a core insert;
a core plate defining a first cavity movably receiving the core insert;
a cavity insert;
a cavity plate defining a second cavity receiving the cavity insert, the cavity insert and the core insert cooperatively defining a molding cavity when they are held together;
an ejection mechanism configured to eject the core insert, the ejection mechanism comprising:
 a top plate defining a first fastening hole;
 a bottom plate defining a though hole; and
 an ejection member comprising an ejection rod and an ejection head, wherein:
  the ejection rod extends through the bottom plate to be fixed to the top plate, the ejection rod comprises a first rod defining a second fastening hole, a first engaging body comprising a protrusion facing toward the first rod, and a first connecting body between the first rod and the first engaging body;
  the ejection head comprises a second rod, a second engaging body defining a recess facing toward the second rod, a second connecting body between the second rod and the second engaging body, and a first ejection portion extending from a bottom of the second rod;
  a shape of the recess matches a shape of the protrusion, the first engaging body and the first connecting body are mutually interengaged with the second connecting body and the second engaging body, with the protrusion fittingly and movably received in the recess; and
  the first ejection portion is engaged in the core insert.

2. The mold as described in claim 1, wherein the ejection mechanism further comprises a washer and a fastener, the washer positioned between the top plate and the bottom plate, the washer defining a through hole aligning with the first fastening hole and the second fastening hole, the fastener extending through the through hole and being threadedly engaged in the first fastening hole and the second fastening hole.

3. The mold as described in claim 2, wherein the fastener comprises a threaded head threadedly engaged in the first fastening hole and a threaded shaft threadedly engaged in the second fastening hole.

4. The mold as described in claim 1, wherein the first cavity is a stepped through hole having a single circumferential step.

5. The mold as described in claim 1, wherein the core insert comprises a molding portion, and a second ejection portion defining an ejection hole, the ejection hole receiving the first ejection portion of the ejection member.

6. The mold as described in claim 5, further comprising a support plate disposed on the core plate to prevent the core insert from disengaging from the core plate, wherein the support plate defines a through hole, and the ejection member extends through the through hole.

7. The mold as described in claim 6, further comprising a core washer retained in the core cavity above the core insert, wherein the core washer defines a through hole, and the ejection portion of the ejection member extends through the through hole of the core washer.

8. The mold as described in claim 5, further comprising a cavity washer received in the second cavity of the cavity plate, wherein the cavity washer defines a through hole, and the through hole of the cavity washer is sized to allow the molding portion to extend therethrough.

9. The mold as described in claim 1, wherein the protrusion and the recess are both hemisphere-shaped.

10. A mold comprising:
a core insert;
a core plate defining a first cavity movably receiving the core insert;
a cavity insert;
a cavity plate defining a second cavity receiving the cavity insert, the cavity insert and the core insert cooperatively defining a molding cavity when they are held together;
an ejection mechanism configured to eject the core insert, the ejection mechanism comprising:
 a top plate defining a first fastening hole;
 a bottom plate defining a though hole; and
 an ejection member comprising an ejection rod and an ejection head, wherein:
  the ejection rod extends through the bottom plate to be fixed to the top plate, the ejection rod comprises a first rod defining a second fastening hole, a first engaging body, and a first connecting body between the first rod and the first engaging body, the first engaging body comprising one of a protrusion and a recess, said one of a protrusion and a recess facing toward the first rod;
  the ejection head comprises a second rod, a second engaging body, a second connecting body between the second rod and the second engaging body, and an ejection portion, the second engaging body comprising the other one of a protrusion and a recess, said other one of a protrusion and a recess facing toward the second rod, and the ejection portion extending from a bottom of the second rod;
  a shape of the recess matches a shape of the protrusion, the first engaging body and the first connecting body are mutually interengaged with the second connecting body and the second engaging body, with the protrusion fittingly and movably received in the recess; and
  the first ejection portion is engaged in the core insert.

* * * * *